United States Patent [19]

Thomas

[11] 4,135,793
[45] Jan. 23, 1979

[54] TRANSDUCER BACKUP ASSEMBLY FOR SOUND MOTION PICTURE FILM HANDLING CASSETTE

[75] Inventor: Paul W. Thomas, Duxbury, Mass.
[73] Assignee: Polaroid Corporation, Cambridge, Mass.
[21] Appl. No.: 756,623
[22] Filed: Jan. 4, 1977
[51] Int. Cl.² ............................................. G03B 31/02
[52] U.S. Cl. ........................................ 352/27; 352/72; 352/78 R; 352/130
[58] Field of Search ................ 352/72, 78 R, 130, 27; 242/199, 200

[56] References Cited
U.S. PATENT DOCUMENTS 3,905,690  9/1975  Scholz ................................. 352/130

*Primary Examiner*—Monroe H. Hayes
*Attorney, Agent, or Firm*—Frederick A. Goettel, Jr.

[57] ABSTRACT

A backup support arrangement is provided against which a film strip, carrying a magnetic sound track adjacent one edge, is biased by a sound recording/playback transducer in a multipurpose photographic film cassette having a sound capability. The support arrangement engages the side of the film strip opposite the side carrying the magnetic sound track and is resiliently mounted in a manner such that the force imparted upon the backside of the film strip is distributed so that a significantly greater biasing force is imparted upon the backside of the film strip adjacent the edge carrying the magnetic sound track than upon the remainder of the film strip.

7 Claims, 5 Drawing Figures

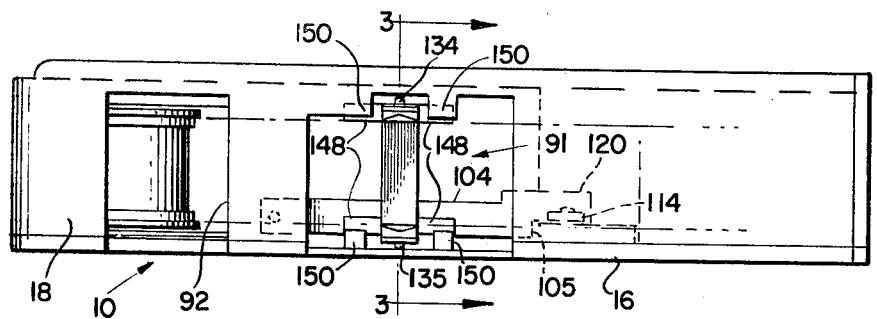
FIG. 2
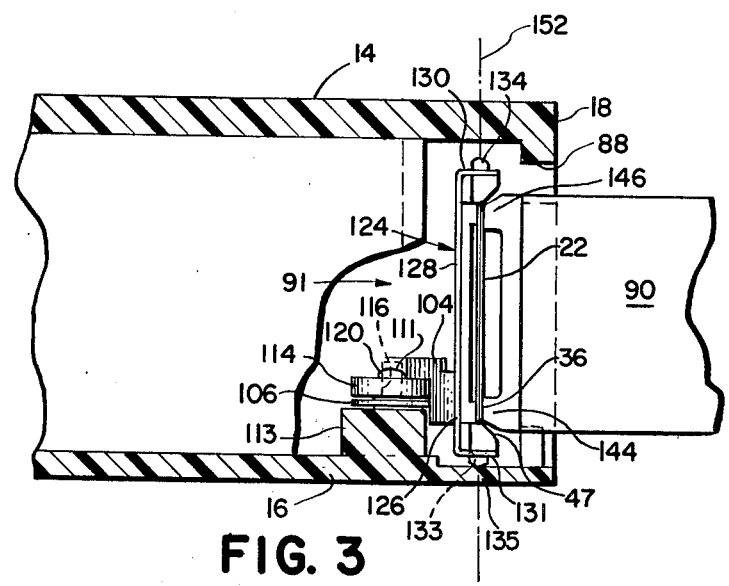
FIG. 3
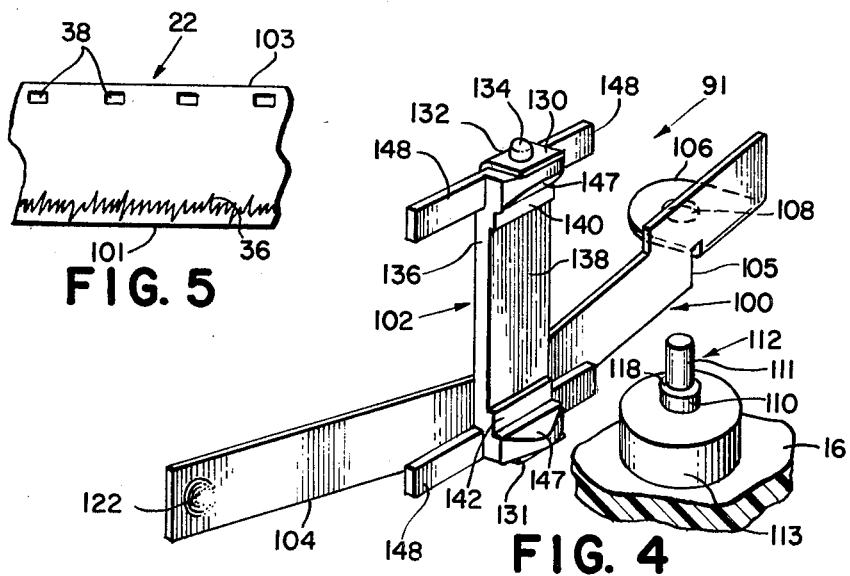
FIG. 5
FIG. 4

TRANSDUCER BACKUP ASSEMBLY FOR SOUND MOTION PICTURE FILM HANDLING CASSETTE

BACKGROUND OF THE INVENTION

This invention relates generally to motion picture photography and, more particularly, to an improved transducer backup arrangement for a multipurpose sound motion picture film handling cassette.

The present invention is directed to a spring and film backup support arrangement against which a film strip is biased by a recording/playback transducer in connection with a photographic film cassette from which the film strip need not be removed during the exposure, processing and projection operations and, more particularly, to film cassettes of the type which include internally programmed film processing systems. Exemplary of such systems are those described in the commonly assigned U.S. Pat. No. 3,785,727 of John F. Batter Jr., et al. As described in the above-referenced patent, a motion picture system has been devised wherein a supply of photographic film contained in a cassette can be exposed in a camera adapted to receive the cassette and then subsequently the cassette is loaded into a projector apparatus which first subjects the cassette to a sequence of operations intended to process the film strip to a viewable condition and then subsequently projects the developed recorded images.

It has also been proposed that the film strip in addition to carrying a photosensitive area, carry a magnetic sound track affixed to or formed as a part thereof. Such film strip and magnetic sound track combinations have been marketed for motion picture cameras and projectors and are commonly used within the photographic art. Whether such films have the magnetic track affixed to or formed as a part of it, recording may be carried out in either the camera or, subsequent to exposure, in a projector type arrangement in which "fill-in" or background comments are provided. When such recording and playback occurs, both a magnetic transducer head and a constant speed drive capstan must be introduced through the cassette structure in order to contact the magnetic track portion of the film strip. A constant speed drive capstan is employed for moving the film strip and magnetic track past the transducer head at a constant speed in order to achieve a good quality of sound recording.

In addition to constant speed of the sound track, it is also extremely important that the contact between the sound track and the recording/playback transducer be extremely good in order to provide quality sound at all desired frequency levels. In order to accomplish this, resilient support means are typically provided behind the film strip in the region of contact with the transducer thereby urging the film strip into contact with the transducer. In a typical arrangement, a resilient means imparts a force to a film strip backup structure which engages the entire backside of the film strip and urges the entire film strip into contact with the transducer head. Such an arrangement imparts a significant drag upon the film strip when the cassette is operating in the sound mode and accordingly requires the cassette structure and the drive means for advancing the film through the cassette to be capable of moving the film strip at the desired speeds with this additional significant drag upon the film.

SUMMARY OF THE INVENTION

In accordance with the present invention, improved means are provided for engaging and supporting the backside of the film strip which is engaged at its other side by a transducer having a magnetic pickup head, in a cassette of the type described hereinabove. The support means which contacts the back of the film strip is mounted by resilient means in a manner such that the force imparted upon the support means by the resilient means is distributed so that the support means imparts a significantly greater biasing force upon the backside of the film strip adjacent the edge of the film strip carrying the magnetic sound track than upon the remainder of the film strip.

In the preferred embodiment, the film strip support or engaging means is at least as wide as the film strip and is adapted to engage and support the film strip at the backside adjacent the edge of the film strip carrying the magnetic sound track and at the backside of the opposing edge thereof. The resilient means which mounts the support means within the cassette housing is made up of a leaf spring mounted within the housing behind the support means and which is bowed outwardly towards the support means and a means for attaching the leaf spring to the support means. The means for attaching the leaf spring to the support means is attached to the support means at both the upper and lower ends thereof and to the leaf spring at only its lower end which is adjacent the magnetic sound track of the film strip.

The leaf spring is sized such that the biasing force imparted upon the backside of the magnetic sound track carrying edge of the film strip is great enough to provide sufficient physical contact between the magnetic sound track and the magnetic head to provide a desired quality sound up to a desired frequency response. Also, the portion of the biasing force imparted upon the backside of the edge of the film strip opposite to that carrying the magnetic sound track is sufficient to maintain the film strip in a desired plane which is defined by the film engaging surfaces of the support means.

Other objects of the invention will in part be obvious and will in part become apparent to those skilled in the art as the following description proceeds. The features of novelty which characterize the invention will be pointed out with particularity in the claims annexed to and forming part of the specification.

BRIEF DESCRIPTION OF THE DRAWINGS

For a fuller understanding of the nature and objects of the invention, reference should be made to the following detailed description taken in conjunction with the accompanying drawings wherein:

FIG. 2 is a diagrammatic side view of the cassette of FIG. 1 taken along the line 2—2 with the transducer head not shown;

FIG. 3 is an enlarged diagrammatic sectional view partially cut away taken along the line 3—3 of FIG. 2 and illustrating the transducer head;

FIG. 4 is a diagrammatic perspective view of the transducer backup assembly incorporated in the cassette of FIG. 1 and which embodies features of this invention; and FIG. 5 is a plan view of a portion of the film strip employed in the cassette shown in FIG. 1.

DESCRIPTION OF THE PREFERRED EMBODIMENT

Figure 1:
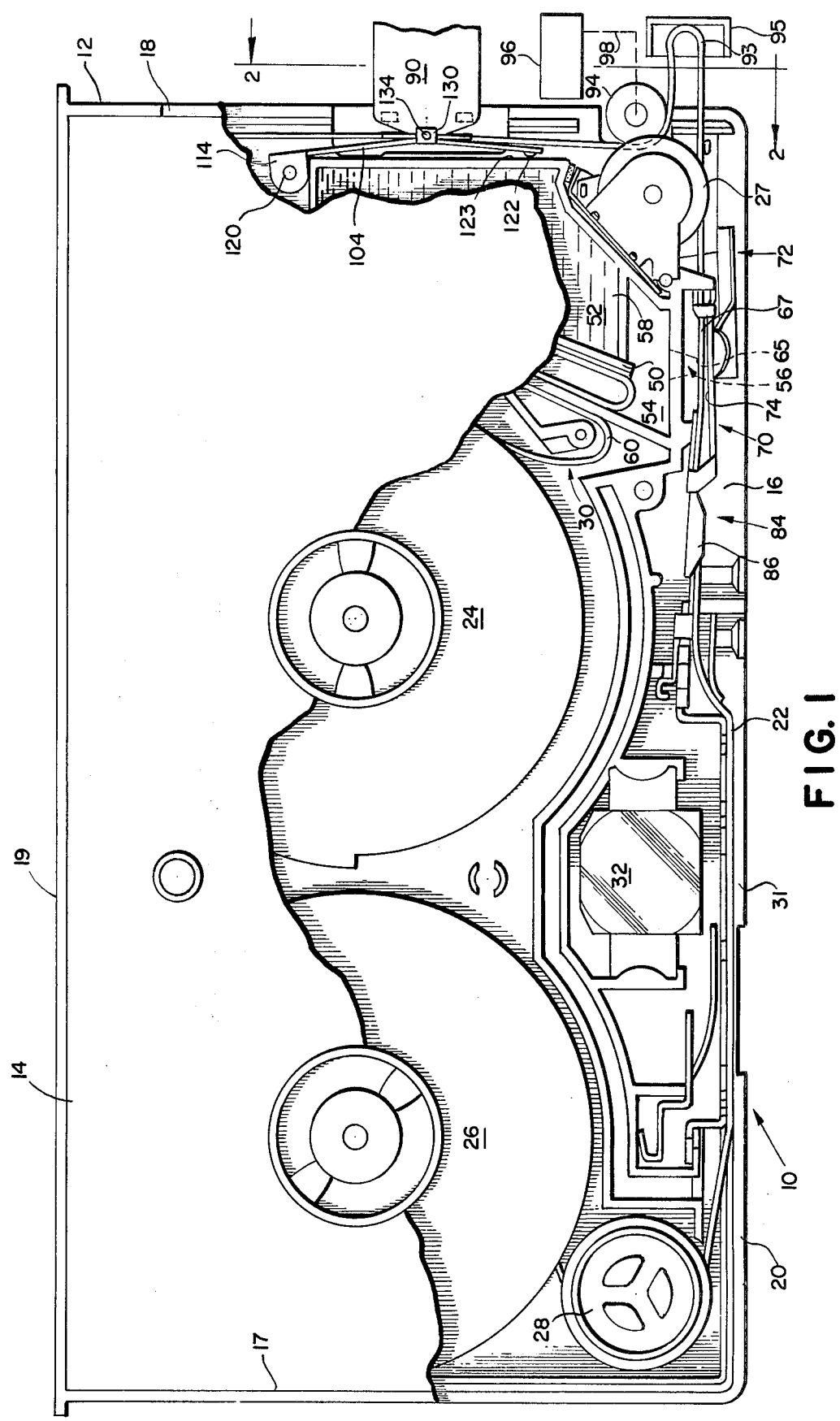
FIG. 1 is a diagrammatic view of a photographic film handling cassette incorporating the present invention.

The illustrated embodiment of the invention, which may be best understood by first referring to FIG. 1 of the drawings, employs a multipurpose film handling cassette 10 of the type described in the above-referenced U.S. Pat. No. 3,785,727 which is configured for substantially automatic processing of the film strip responsive to appropriate transport of the latter within the cassette. As shown in FIG. 1, the cassette 10 comprises a generally parallelepiped housing 12 constituted by planar faces or sidewalls 14 and 16, end walls 17 and 18, and elongated top and bottom edge walls 19 and 20. Carried within the housing 12 is a photographic film strip which is permanently attached at one of its ends to a rotatable supply spool or reel 24 from which it extends within the housing 12, in a somewhat extended path around suitable rollers, two of which, 27, 28, are shown in the drawing, to a takeup spool or reel 26 to which the opposite end of the film is attached. In its path within the housing 12, the film 22 extends past a normally inoperative film processing station 30, which is subsequently explained in detail, and across an opening 31 which function at different times to facilitate both exposure and projection. For facilitating the latter operation, a prism 32 is mounted behind the film strip 22 and in adjoining relation to both the opening 31 and to an illumination aperture (not shown) in the sidewall 14.

In the illustrated embodiment, the processing operation is substantially controlled by the film transport program to which the cassette is subjected. This is accomplished, as later explained in more detail, by utilizing one of the film spools and the film strip itself to provide both information and energy to the processing station 30 of the cassette. Consequently, the photographic film strip 22 is designed to cooperate with operational elements of the processing system and preferably comprises a base of any suitable transparent material carrying at least over the central portion thereof an emulsion of photosensitive coating of any conventional variety as, for example, an emulsion developed by a monobath processing composition to form a positive transparency suitable for projection.

FIG. 5 illustrates a section of the photographically useful portion of the film strip 22. Carried along one edge of the film strip are a plurality of conventional sprocket holes 38 which are configured for cooperation with a drive pawl (not shown) in either a camera or projector for incremental advancement of the film. The film strip also includes a magnetic sound track 36 provided in the vicinity of one edge thereof and which is adapted to have sound information first recorded thereon and then subsequently extracted therefrom.

Referring again to FIG. 1, a film processing station 30 generally comprises a housing 50 having a first compartment or receptacle 58 retaining a source of processing fluid 52 which following removal of tear tab 60 is adapted to release the fluid to a second compartment 54 which includes a nozzle generally designated at 56. The latter includes a nozzle opening 65 which extends from the compartment 54 to a film engaging surface 67 of the nozzle which is configured for depositing a layer (not shown) of controlled thickness of the processing fluid on the film strip 22 during transport of the latter towards the supply spool 24, that is, in its rewind direction. Deposit of a suitable layer of the fluid 52 is facilitated by a doctor blade element which is depressed slightly below the film engaging surface 67 and which, in cooperation with the latter, and a pressure pad, described below, supplies a substantially uniform coating of fluid on the film strip 22.

Mounted beneath the applicator housing 50 is a pressure pad assembly 70. As shown in FIG. 1, the film strip 22 normally passes between the nozzle surface 67 and a raised film engaging surface 74 of the pad assembly 70. The latter is mounted on and biased towards the nozzle surface 67 by a suitable spring assembly 72.

A wedge-like slide valve 84 shown in FIG. 1, is displaceably mounted in adjoining relation to a leading end of the pressure pad assembly 70 and is configured to be displaced into blocking engagement with the nozzle 65 upon completion of the processing operation. In this arrangement, the slide valve 84 carries a downwardly extending arm 86 which, at the end of the rewind operation, is configured to carry the valve to the right of the position shown in FIG. 1. This displacement forces the valve 84 into blocking engagement with the nozzle opening 65. For a more detailed description of the processing, equipment and operation thereof, reference should be made to U.S. Pat. No. 3,724,086, entitled "Photographic Apparatus Having an Improved Film Operated Processing System" of Gerald H. Cook and assigned to the assignee of the present application.

A plurality of apertures are located in cassette 10 for facilitating the introduction of an audio system into operable association with the magnetic tape portion 36 of film strip 22. A first aperture 88 located in end wall 18 permits the magnetic recording and playback transducer head 90 to enter cassette 10 and contact the magnetic tape portion 36 of film strip 22. Details of a suitable transducer head and its associated structure are claimed and described in U.S. Pat. No. 3,888,570 which is assigned to the assignee of the present application. Transducer backup assembly 91 comprising the subject of the present invention and described in detail hereinbelow is located within the cassette 10 behind the film strip 22 for insuring proper engagement and alignment, with significantly reduced film drag, between the transducer head and magnetic tape portion 36 of the film strip 22.

A second aperture 92 is provided at the lower right hand corner of cassette 10 (as viewed in FIG. 1) for permitting the introduction of a constant speed drive capstan 94 into cassette 10 proximate idler roller 27. The constant speed drive capstan 94 is driven, in turn, by a constant speed motor 96 via appropriate linkages shown generally by dashed line 98. The capstan 94 is formed as a portion of a large flywheel (not shown) for insuring the relative unvariability of its speed.

It should also be noted that both the transducer head 90 and capstan 94 are selectively moveable into and out of engagement with the film strip 22 and magnetic track portion 36 during the various operations performed in the camera and projector described above. The specific structure and mechanism for accomplishing these movements is claimed and described in U.S. Pat. No. 3,848,977.

While a conventional claw type film advance mechanism (not shown) may be employed for moving the film strip to the takeup reel 26, such incremental motion is not easily adapted to an audio system which requires the associated magnetic tape to pass through at a constant speed. Accordingly, the incremental motion of the advancing claw mechanism must be isolated from the transducer head 90 in order to achieve the degree of audio quality desirable in such motion picture systems. In order to achieve this isolation, means have been devised for automatically forming an isolation loop between the claw mechanism (not shown) and the magnetic tape transducer head. With such a system, the isolation loop is automatically formed whenever the transducer head is moved into engagement with the magnetic tape portion 36 of the film strip 22. Such an isolation loop 39 is illustrated in FIG. 1 wherein positioned near the loop 93 is an electric eye assembly 95 which monitors the loop and which instructs the drive motor (not shown) of the claw mechanism to speed up should loop 93 get too large. A sound cassette having such a capability, and sound recording and playback photographic apparatus for use with such a cassette are described and claimed in U.S. Pat. Nos. 3,850,512 and 3,921,880, respectively, both of Donald T. Scholz and assigned to the assignee of the present invention.

Referring now to the details of FIGS. 2, 3 and 4 and with general reference to FIG. 1, the transducer backup assembly of the present invention will be described in detail. As best seen in FIG. 4, the transducer backup assembly 91 of the present invention comprises two major components: the first being the support means generally identified by reference numeral 100 which is a generally vertically extending component which serves to engage and support the film strip 22 when the film strip is engaged by the transducer head 90 as will be more fully set forth hereinbelow.

The second major component of the transducer backup assembly 91 is a support means generally identified by reference numeral 102 which is adapted to mount the support means 100 for engaging and supporting the film strip and imparting a biasing force upon the support means to bias the support means and the film strip which it supports into engagement with the transducer means when the transducer is in its operative position. The resilient means 102 carries the support means 100 in such a manner that the support means imparts a significantly greather biasing force upon the backside of the edge 101 of the film strip 22 which carries the magnetic sound track than upon the remainder of the backside of the film strip.

The resilient means 102 comprises an elongated leaf spring member 104 which is mounted within the cassette housing 12 behind the support means 100 and which is bowed outwardly of the interior of the cassette housing 12. The leaf spring member 104 is provided with a mounting tab 106 at one end thereof which is bent substantially normal to the plane of the leaf spring itself. The mounting tab 106 is provided with a through opening 108 which is adapted to loosely receive an enlarged portion 110 of a mounting post 112 extending upwardly from a structural portion 113 of the cassette sidewall 16. A retaining washer or bearing 114 having an opening 116 therethrough which is adapted to receive the reduced diameter portion 111 of the post 112 rests upon the shoulder 118 defined between the small and large diameter sections of the mounting post. Following installation of the resilient means 102 and the retaining washer 114, the upper end of the small diameter portion of the post is suitably deformed to an enlarged diameter 120 which serves to retain the washer and the resilient means in the desired position. The height of the larger part of the mounting post 110 is such that the leaf spring mounting tab 106 is not tightly grasped therein, thereby permitting a certain degree of restricted motion of the resilient means 102 and the support means 100 carried thereby, in all directions.

The opposite end of the leaf spring member 104 is provided with a dimple 122 which is adapted to be supported in slidable engagement with a suitable structural portion of the cassette. In the illustrated embodiment, this end of the leaf spring bears against the outer wall 123 of the fluid retaining reservoir of the processor 30.

As best seen in FIG. 3, the leaf spring 104 has integrally formed therewith an elongated vertically extending C-shaped section 124 which is attached to the leaf spring member 104 only near its lower end 124. The downward jog 105 in the leaf spring 104 is provided to shift the spring downward toward the lower end of the film strip support means 100. The significance of this arrangement will be more fully appreciated as the present description continues.

The vertical extending central leg 128 of the C-shaped section 124 is sized so that the upper and lower legs of the C-shaped section 130, 131 respectively, extend above and below the upper and lower extremities of the film strip support means 100. The upper and lower legs 130, 131 are each provided with suitable openings 132, 133 respectively, sized to receive upper and lower vertically extending mounting pintles 134, 135 respectively, formed integrally with the support means 100. The engagement between the mounting pintles 134, 135 and the opening 130, 131 is such as to provide a limited degree of freedom of motion of the support means within the mounting C-shaped member. The freedom of motion derived by mounting of the support means in the above-described manner, taken with the freedom of movement permitted by the mounting of the resilient means to the cassette permits the transducer backup assembly 91 to shift its position as necessary to accommodate a misaligned transducer head.

The film strip support and backup means 100 comprises a vertically extending major portion 136 having a recessed central portion 138 defined by a pair of film strip engaging surfaces 140, 142. The lower film strip engaging surface 142 is adapted to engage the backside of the film strip adjacent the edge 101 of the film strip 22 which carries the magnetic sound track 36. The other film strip engaging surface 140 is adapted to engage the backside of the film strip adjacent the opposite edge 103 of the film strip 22 so as to cooperate with the lower surface 142 in supporting the film strip in a substantially vertical plane when the film strip is biased against the film strip engaging surfaces 140, 142 by the transducer head 90, as best shown in FIG. 3. The film strip is supported in this manner in order to preclude contact of the support means 100 with the wet emulsion layer of the film strip following deposition of the processing fluid. The outer edges of the film strip which are in contact with the film engaging surfaces 140, 142 are coated with the developing liquid and such contact does not affect the quality of the film strip or its image.

The transducer head 90 has a magnetic sound recording/pickup head 144 mounted at its lower end in a position whereby it engages the magnetic sound track 36 of the film strip 22. The transducer head also carries a wear surface or wear block 146 at its upper end which engages the film strip adjacent the opposite edge 103 of the film strip to bias it against the upper surface 140 of the support means 100 resulting in the aforementioned support of the film strip in a vertical plane.

As best seen in FIGS. 3 and 4, the vertical section 136 of the support means is further provided with a pair of ramped sections 147 above and below the upper and lower film strip engaging surfaces 140, 142 which serve to guide the film strip downwardly or upwardly as necessary in order to assure proper positioning of the film strip in engagement with the film engaging surfaces 140, 142.

Extending outwardly from both the upper and lower ends of the vertical section 136 of the support means are a pair 148 of retaining arms which are adapted to engage four retaining surfaces 150 integrally formed with the cassette housing 12. The combination of the restraining arms 148 and their mating surfaces 150 serve to prevent outward motion of the support means when not engaged by the transducer head 90 while permitting free motion of the transducer backup assembly 91 into the interior of the cassette when it is being operated in the sound mode with the sound transducer engaged therewith as shown in FIG. 3.

The illustrated embodiment described above will result in a significantly greater biasing force being imparted to the backside of the edge 101 of the film strip which carries the magnetic sound track 36 than upon the remainder of the film strip when the film strip is biased into contact with the film engaging surfaces 140, 142 by the transducer head 90. Such an arrangement permits the overall force, and the resulting dragging force upon the film strip, which must be imparted by the transducer head to the film strip to be only slightly greater than the overall force necessary to provide the desired contact level between the magnetic head and the magnetic sound track.

As an example, in the preferred embodiment, it was found that an overall biasing load of 50 grams imparted by the transducer means 90 would be reacted by the film engaging surfaces 140, 142 in a one-to-nine (1:9) ratio; that is, a 45 gram load would be experienced at the lower engaging surface 142 backing the magnetic sound track bearing portion of the film strip and a 5 gram load would be experienced at the upper surface 140. This load relationship, it was found, provided a biasing force of the magnetic head against the magnetic sound track 36 sufficient to provide a desired quality sound up to a desired frequency reponse. Similarly, the 5 gram load experienced at the upper film strip engaging surface 140 was sufficient to retain the film strip 22 in the desired vertical plane defined by the film strip engaging surfaces 140, 142 while providing an extremely light drag load at the upper surface. It should be appreciated that were the biasing force of the transducer head reacted by the film strip support means in a conventional, symmetrical fashion, an overall biasing force of 90 grams would be necessary with the necessary 45 gram load being experienced at both the upper and lower film strip engaging surfaces.

Referring now to FIG. 3, it will be seen that the axis of rotation 152 of the support member 102 as supported by the upper and lower pintles 134, 135 in the openings 132, 133 respectively passes substantially in alignment with the film support plane defined by the film engaging surfaces 140, 142. Such an arrangement negates the tendency of the support member 102 to rotate about the axis 152 in response to frictional forces between the film strip and the surfaces 140, 142 when the film strip 22 is being advanced. The frictional forces developed have no lever arm to act thorugh and accordingly the moment developed about the axis 152 is zero.

Accordingly, a novel film strip backup means has been provided wherein a film strip support means is carried by a resilient means which supports the support means in a fashion to engage the backside of a sound track bearing film strip and for imparting a biasing force upon the support means when in engagement with a transducer so that the support means imparts a significantly greater biasing force upon the backside of the edge of the film strip carrying the magnetic sound track than upon the remainder of the film strip.

This invention may be practiced or embodied in various other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A sound motion picture film handling cassette adapted to be mounted in a photographic apparatus and to be engaged by transducer means, said transducer means having a magnetic pickup/recording head and being movable between an idle position and an operative position, said cassette comprising:

a housing having an opening provided therein to permit said transducer means to be introduced thereinto when moved to its said operative position;

a strip of photographic film coiled within said housing for translation along a predetermined path therethrough, one side of said film having a magnetic sound track adjacent one edge thereof and facing outwardly of said housing;

a film support member having two ends spaced apart a distance at least as great as the width of said film strip;

resilient means mounting said support member in said housing for engaging and supporting said film and imparting a biasing force upon said support member to bias said film strip into engagement with said transducer means with said magnetic sound track in engagement with said magnetic head when said transducer means is in its said operative position, said resilient means comprising a leaf spring mounted within said housing behind said support member and having first and second ends, said leaf spring being bowed outwardly toward said support member and being attached to said housing at said first end thereof;

means for attaching said leaf spring to said support member, said means for attaching engaging said support member at the ends thereof and said means for attaching being attached to said leaf spring at only the end of said means for attaching adjacent said magnetic sound track of said film strip; and wherein said cassette includes means for supporting said second end of said leaf spring for unrestrained sliding motion substantially in the direction of travel of said film strip, whereby a significantly greater biasing force is imparted upon the backside of said film strip adjacent said one edge than upon the other portions of said film strip in engagement with said transducer means.

2. The apparatus of claim 1 wherein said leaf spring extends in a direction substantially parallel to the direction of movement of said film strip and wherein said leaf spring includes a mounting tab integrally formed with said leaf spring, and extending into the interior of said cassette housing in a direction substantially normal to said leaf spring, said mounting tab having an opening therethrough;

said cassette housing having an interiorly formed upstanding mounting pin formed from a thermoplastic material and adapted to pass through said opening in said mounting tab, the upper end of said post being deformable to form a portion larger than the opening in said tab whereby said resilient means is mounted for pivotable motion about the axis of said mounting pin.

3. The apparatus of claim 1 wherein said support member is provided with means for retaining said support means within said cassette housing when said transducer means is not in engagement therewith.

4. The apparatus of claim 3 wherein said means for retaining comprises a plurality of retaining legs laterally extending from the sides of said support member and retaining surfaces provided in said housing substantially in the plane of said opening structured and arranged to engage said retaining legs.

5. The apparatus of claim 1 wherein said support member comprises a first surface to engage and support the backside of said film strip adjacent said one edge and a second surface to engage and support the backside of said film strip adjacent the opposing edge thereof;

wherein upon movement of said transducer means to its said operative position, said leaf spring imparts a force to said means for attaching said leaf spring to said support member, said means for attaching in turn imparting a first portion of said force to said support member for biasing said first surface of said support member against the backside of said magnetic sound track carrying portion of said film strip, said first portion of said force being great enough to provide sufficient physical contact between said magnetic sound track and said magnetic head to provide a desired quality sound up to a desired frequency; and wherein the remainder of said force biases said second surface of said support member into engagement with the backside of said film adjacent said opposing edge and is just sufficient to maintain said film strip in a desired plane defined by said first and second support surfaces of said support member.

6. The apparatus of claim 1 wherein said support member further comprises a first surface for engaging and supporting the backside of said film strip adjacent said one edge and a second surface for engaging and supporting the backside of said film strip adjacent the opposing edge thereof, a recessed portion being defined between said first and second surfaces;

upper and lower mounting pins extending from the upper and lower ends, respectively, of said support member along an axis normal to the direction of movement of the film strip thereby; and wherein said means for attaching said leaf spring to said support member comprises an elongated C-shaped member having an intermediate member disposed behind and in close proximity to said support member and upper and lower legs extending above and below, respectively, said support member, said upper and lower legs having openings therethrough which are sized to receive said upper and lower mounting pins therethrough to mount said support member for limited movement about said axis.

7. A sound motion picture film handling cassette adapted to be mounted in a photographic apparatus and to be engaged by transducer means, said transducer means having a magnetic head and being moveable between an idle position and an operative position, said cassette comprising:

a housing having an opening provided therein to permit said transducer means to be introduced thereinto when moved to its said operative position;

a strip of photographic film coiled within said housing for translation along a predetermined path therethrough, one side of said film having a magnetic sound track adjacent one edge thereof and facing outwardly of said housing;

a film support member having a film engaging surface for engaging and supporting the backside of said film strip, said film support member having upper and lower mounting pins extending from the upper and lower ends, respectively, of said film support member along an axis normal to the direction of translation of the film strip thereby;

resilient means mounting said support member in said housing for engaging and supporting said film and imparting a biasing force upon said support member to bias said support member into engagement with said transducer means with said magnetic sound track in engagement with said magnetic head when said transducer means is in its said operative position, said resilient means comprising an elongated C-shaped member having an intermediate member disposed behind said support member and upper and lower legs extending above and below, respectively, said support member, said upper and lower legs having openings therein which are sized to receive said upper and lower mounting pins therethrough to mount said support member for limited movement about said axis, said axis extending substantially coincidental with said film engaging surface of said film support member.

* * * * *